Jan. 28, 1958    R. K. NORTON    2,821,390
SHEET CONVEYOR MECHANISM
Filed Aug. 26, 1953    6 Sheets-Sheet 1

INVENTOR.
ROBERT K. NORTON
BY
ATTORNEYS

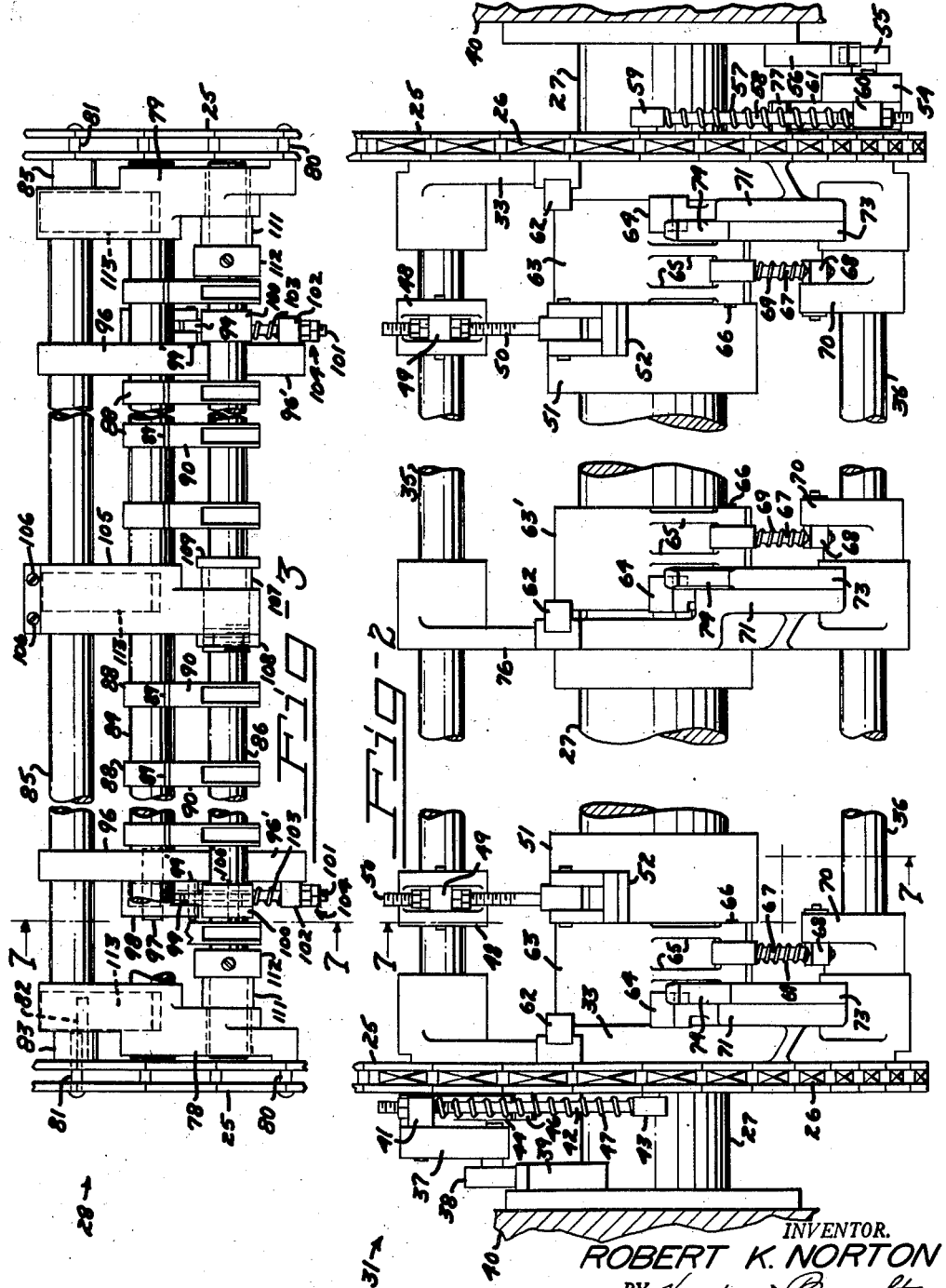

Jan. 28, 1958   R. K. NORTON   2,821,390
SHEET CONVEYOR MECHANISM
Filed Aug. 26, 1953   6 Sheets-Sheet 3
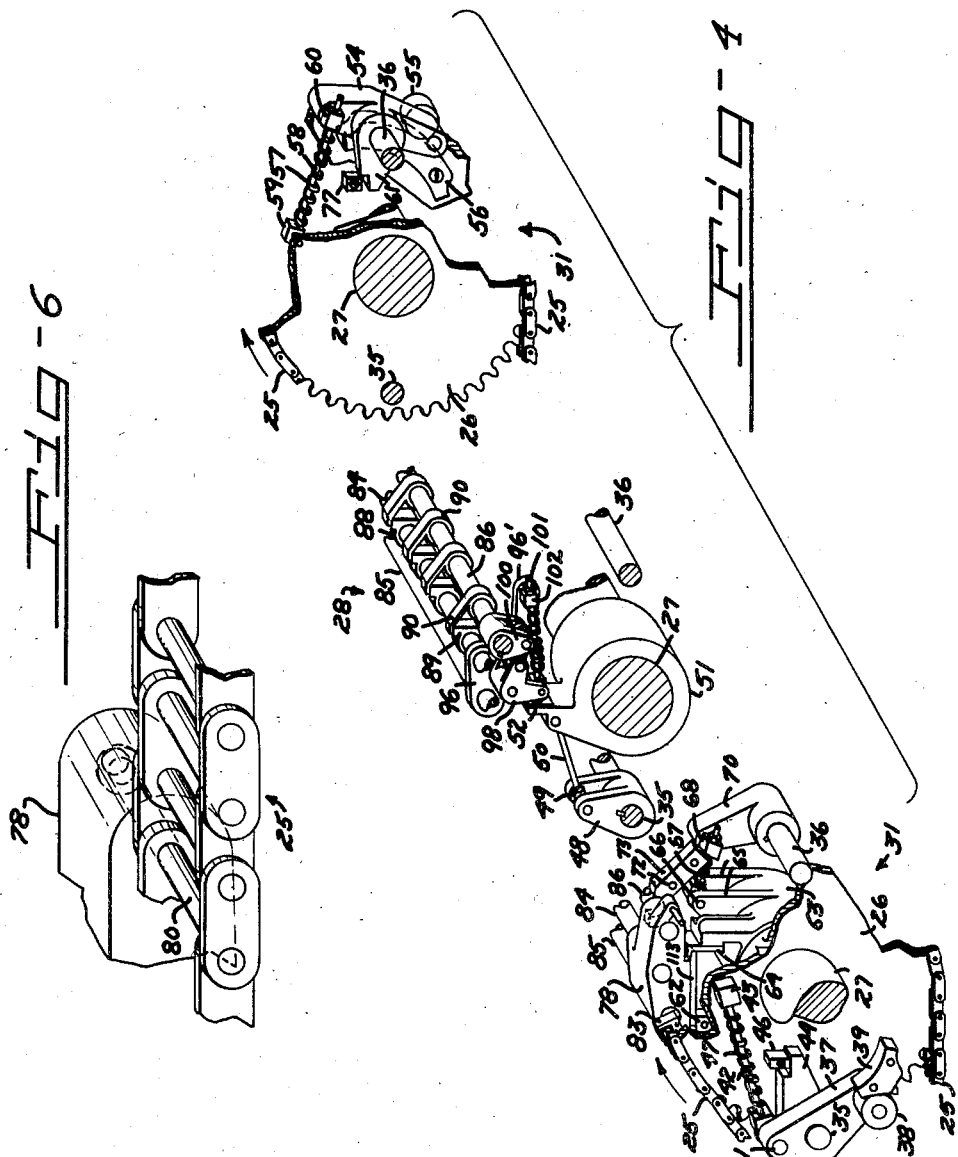
INVENTOR.
ROBERT K. NORTON Jan. 28, 1958 R. K. NORTON 2,821,390
SHEET CONVEYOR MECHANISM
Filed Aug. 26, 1953 6 Sheets-Sheet 4
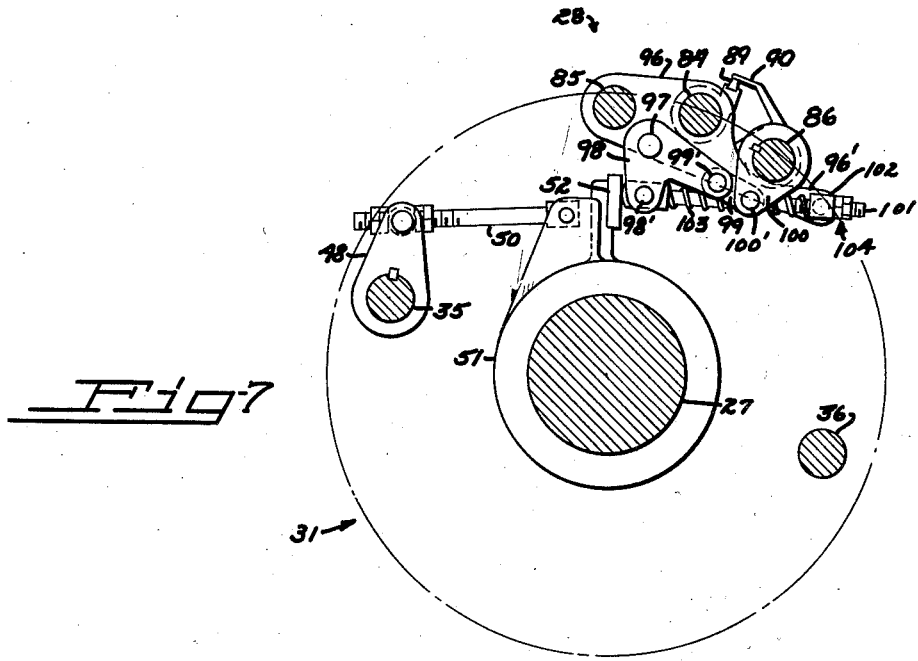
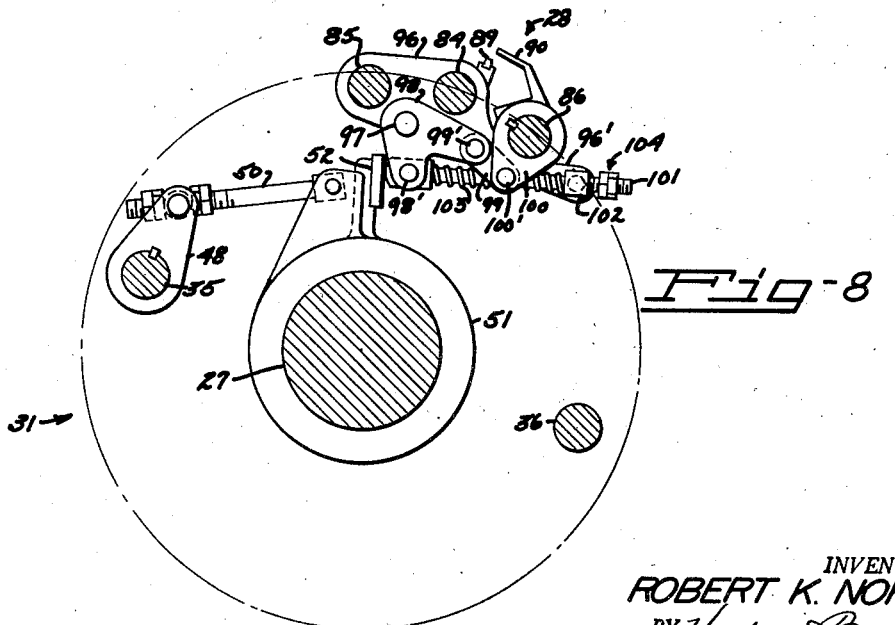
INVENTOR.
ROBERT K. NORTON
ATTORNEYS Jan. 28, 1958    R. K. NORTON    2,821,390
SHEET CONVEYOR MECHANISM
Filed Aug. 26, 1953    6 Sheets-Sheet 5
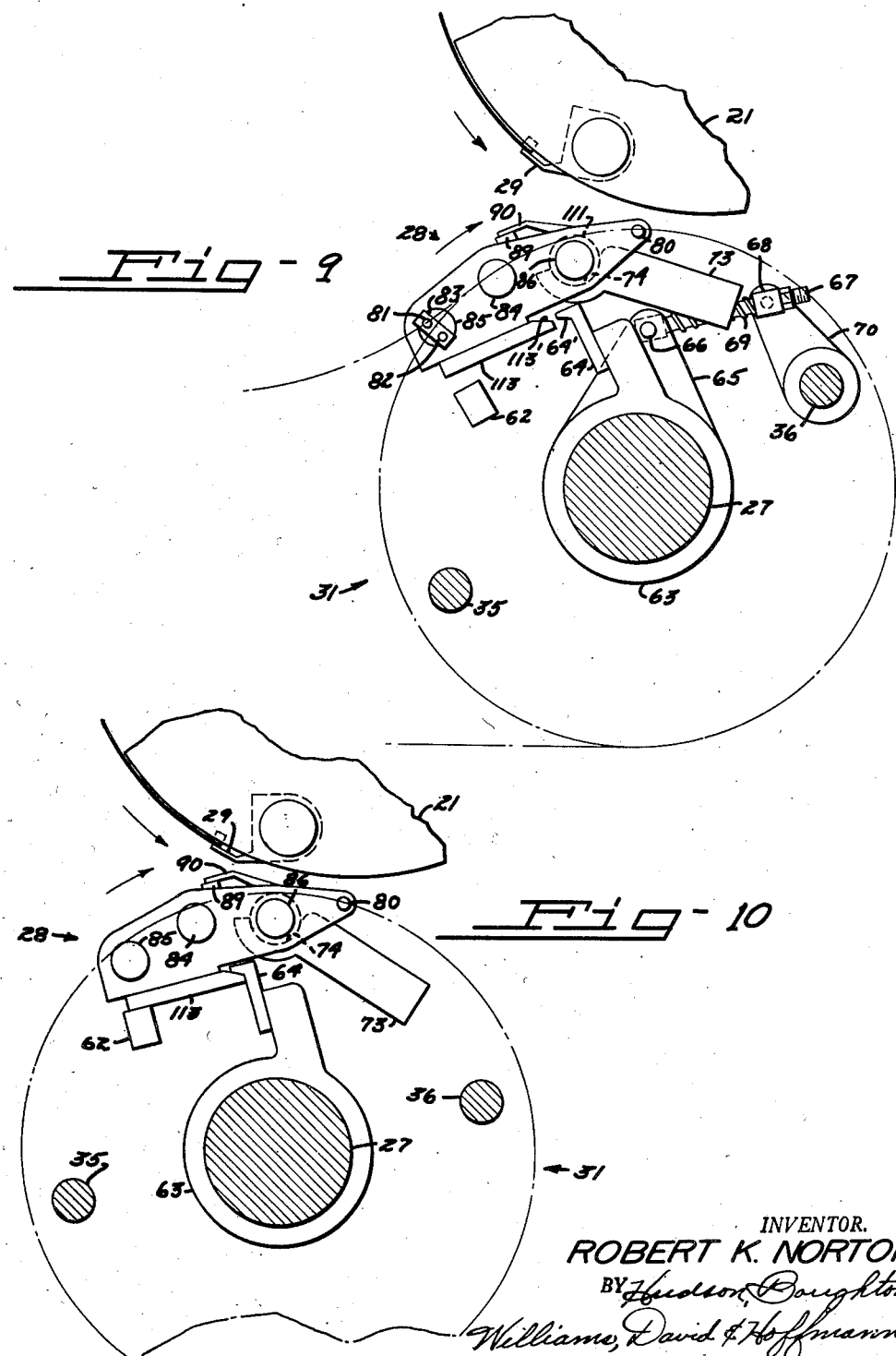
INVENTOR.
ROBERT K. NORTON

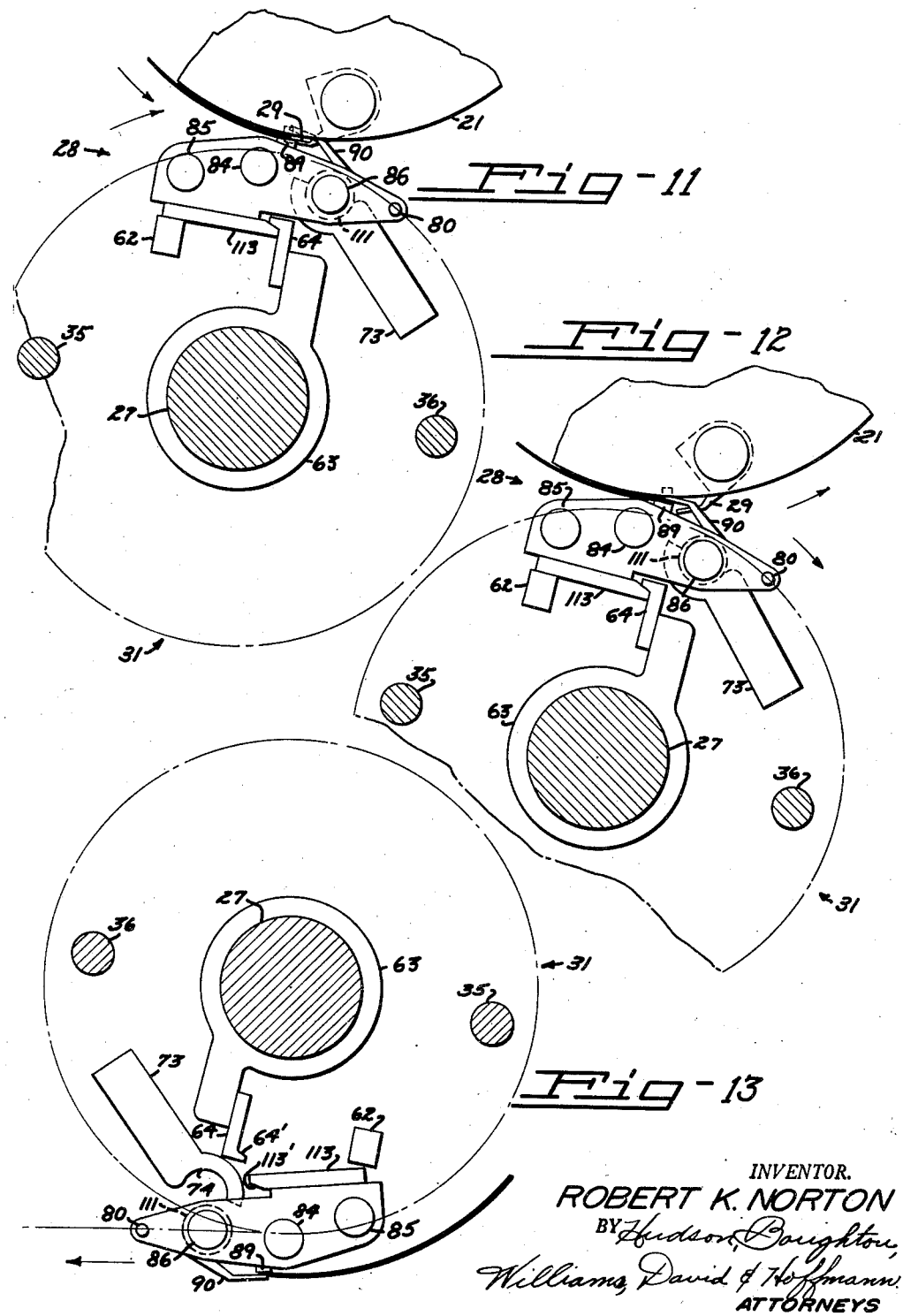

United States Patent Office 2,821,390
Patented Jan. 28, 1958

2,821,390

SHEET CONVEYOR MECHANISM

Robert K. Norton, Twinsburg, Ohio, assignor to Harris-Seybold Company, Cleveland, Ohio, a corporation of Delaware Application August 26, 1953, Serial No. 376,624

9 Claims. (Cl. 271—45)

This invention relates to improvements in sheet conveyor mechanism, and more particularly to conveyors comprising a pair of endless chains running over a skeleton cylinder and having gripper assemblies spaced along the conveyor with means for registering the different assemblies accurately upon the cylinder during their passage around the cylinder.

One of the objects of the present invention is the provision of a gripper assembly embodying a plurality of transverse members in which the foremost member is the gripper shaft and in which that shaft is the element of the assembly that is employed for effecting register with the cylinder.

Another object is the provision of registering means comprising bushings or bearings for the gripper shaft which may be locked to the cylinder while the shaft is free to turn therein.

Another object is the provision of means for holding one of said bushings against movement transversely of the assembly and for holding that bushing against transverse movement in the transfer cylinder in order to accomplish accurate transverse alignment of sheets carried by the conveyor.

Another object of the invention is the provision of means for locking an assembly registered with the skeleton cylinder to that cylinder at transversely spaced points, wherein the individual locking means comprises pressure springs some or all of which may yield more or less in order to insure the desired locking action in spite of variations in the dimensions of the parts in the same or different assemblies.

Still another object is the provision of improved means for connecting the side plates of a gripper assembly to the chains upon which they are carried and providing compensation for the travel of the chains in the straight-away and arcuately around the transfer cylinder.

Other objects and features of novelty will appear as I proceed with the description of that embodiment of the invention which, for the purposes of the present application, I have illustrated in the accompanying drawings, in which:

Fig. 2 is a plan view of a transfer cylinder employed in connection with the invention;

Fig. 3 is a plan view of a gripper assembly adapted to cooperate with the cylinder of Fig. 2;

Fig. 4 is a perspective exploded view illustrating selected portions of the mechanism in which an assembly is traveling over the transfer cylinder;

Fig. 6 is a similar view showing the connection between the forward end of the side plate and the chain;

Fig. 7 is a vertical sectional view corresponding to the section lines 7—7 on both of Figs. 2 and 3, showing the gripper shaft in sheet gripping position;

Fig. 8 is a similar view showing the gripper shaft in gripper open position, and Figs. 9 to 13 inclusive are diagrammatic views showing the positions of the parts on an impression cylinder and a chain conveyor as the latter moves toward and through sheet transferring position and toward and into the position in which the gripper assembly leaves the transfer cylinder.

Figure 1:
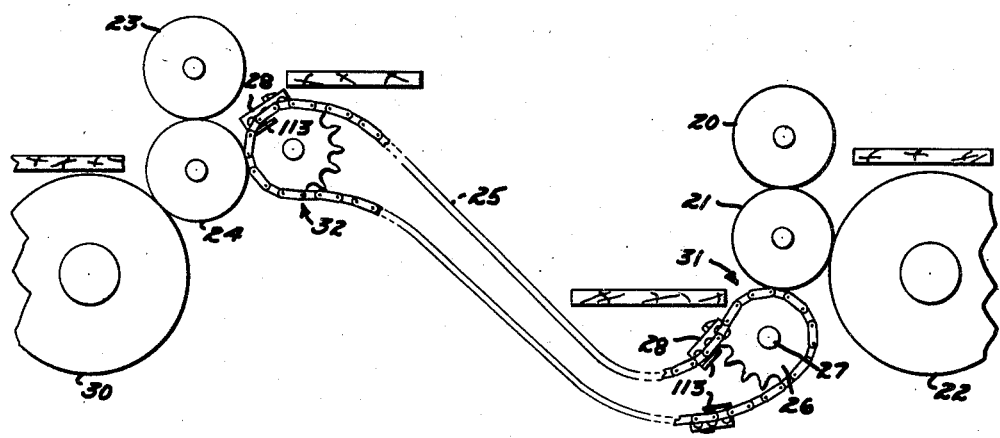
Fig. 1 is a diagrammatic side view showing one application of the invention wherein sheets are transferred from one unit to the next of a multicolor printing press.

In Fig. 1 of the accompanying drawings 20 and 21 represent form and impression cylinders respectively of one unit of a multicolor printing press, this unit receiving sheets from a previous unit by way of a double size transfer cylinder 22. Similarly, 23 and 24 represent form and impression cylinders of another printing unit. The sheets printed in the couple 20, 21 are taken by a chain conveyor comprising a pair of spaced endless chains 25 running over sprockets 26 fixed to a central shaft 27. The conveyor carries a series of gripper assemblies 28 spaced apart a distance such that one gripper assembly will be registered with the cylinder for each revolution thereof.

The impression cylinder 21 and the shaft 27 are intergeared so that each time the grippers 29 on cylinder 21, see Figs. 9 to 13, pass the line of centers of cylinder 21 and shaft 27, a sheet may be transferred from cylinder 21 to a gripper assembly 28 then passing the line of centers as indicated in Figs. 11 and 12. Similarly each sheet carried by a gripper assembly along the lower run of the chain conveyor will be delivered by the assembly to the grippers, not shown, of impression cylinder 24, after which it will be printed in the couple 23, 24 and taken by transfer cylinder 30, or by sheet delivery mechanism, as may be desired. It will be apparent that the two skeleton transfer cylinders, generally designated 31 and 32, and the mechanism carried thereby, may be similar, and consequently cylinder 31 only will be described in detail.

The sprockets 26 at both ends of skeleton cylinder 31 are fixed to castings 33 which are keyed to shaft 27. In castings 33 there are journaled two shafts 35 and 36. Shaft 35 carries a lever 37 upon one end of which there is rotatably mounted a cam follower 38 which is adapted to run over a cam 39 that is bolted to the frame 40 of the machine. The opposite end of the lever carries a noddle pin 41 through which extends a rod 42 that is pivoted at 43 to the sprocket 26. On the lever there is a projecting arm 44 which contacts a stop 46 on the sprocket except when follower 38 is in engagement with cam 39. A coil spring 47 surrounding rod 42 holds follower 38 on its cam and swings lever 37 to turn shaft 35 counterclockwise when the cam permits.

Inwardly of the sprocket 26 on the left side of the machine as viewed in Figs. 2 and 4, shaft 35 has clamped thereto a crank arm 48 carrying a noddle pin 49 which is drilled to take slidably the threaded end of a rod 50 which is adjustably clamped to pin 49 by nuts 50'. Rod 50 is pivoted to a collar 51 that is rotatably mounted on the shaft 27. This collar carries an upwardly projecting abutment 52. These parts are duplicated on the other side of the machine inwardly of the sprocket 26 on that side, as illustrated in Fig. 2.

Shaft 36 outwardly of the sprocket on the right side of the machine has keyed thereto a lever 54 on the outer end of which is a roller follower 55 that runs upon the outer surface of a cam 56 which is bolted to the frame. This follower is held against its cam by a spring 57 which is wound around a rod 58 pivoted at 59 to the sprocket. The other end of rod 58 extends through a hole in a noddle pin 60 which is pivotally mounted on lever 54 at the end thereof opposite the follower 55. An arm 61 integral with lever 54 is adapted to contact a stop 77 mounted on the sprocket 26 to limit the swing of lever 54 clockwise when follower 55 is off the cam.

Attached to the inner face of casting 33 on the left side of the machine there is an adjustable stop 62 the purpose of which will be explained later. Adjacent the casting a collar 63 is rotatably mounted on the shaft 27. It carries a hook 64. It also carries a bifurcated arm 65 in which is pivotally mounted a pin 66 which passes through a head on the end of a short rod 67, the opposite end of which extends through a hole in a noddle pin 68 with a spring 69 surrounding the rod and bearing at its ends against the head of rod 67 and noddle pin 68. The latter pin is pivotally mounted in the free end of a crank arm 70 which is keyed to shaft 36. Casting 33 has an offset portion 71 to which is fastened by means of bolts 72 a centering block 73 in the upper end of which there is formed a socket 74 of circular contour. All of these parts are duplicated except as to rights and lefts at the opposite side of the machine.

At an intermediate point between the ends of the transfer cylinder 31 there is mounted upon and fixed to shaft 27 a bracket 76 having bearings for the shafts 35 and 36. A collar 63' is rotatably mounted on shaft 27 adjacent bracket 76, which collar carries a hook 64, a bifurcated arm 65 and other parts corresponding with the parts similarly numbered at the sides of the cylinder. Similarly, the crank arm 70 associated with this bracket communicates motion to the collar 63' in the same manner as is done by the parts at the sides of the cylinder bearing the same reference numerals. Consequently the three hooks 64 may be swung through a limited angle simultaneously by the turning of shaft 36.

The operation of hooks 64 through the intermediacy of springs 69 is an important feature of the invention. More or less variation in the machining of the hooks and of the locking plates, hereafter described, with which they cooperate is unavoidable in commercial manufacturing procedure, and this variation would detract from the effectiveness and accuracy of the locking action except for these springs. They function to insure positive locking at all three points of all of the gripper assemblies.

Figure 5:
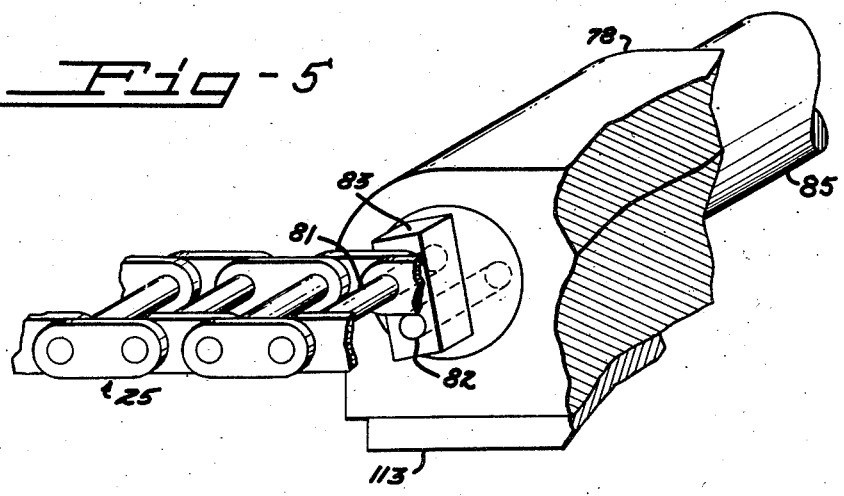
Fig. 5 is a fragmental perspective view showing the connection between the rear end of a side plate and the chain on that side of the machine.

Each of the gripper assemblies 28 comprises two side plates 78 and 79 which are duplicates except for rights and lefts. The plates 78 and 79 as shown herein are disposed on the inner sides of the chains. The plate 78 is carried by the chain pins 80 and 81 and which pins are spaced several links apart. The forward end of the plate is mounted directly on a lateral extension of the pin 80, as shown particularly in Fig. 6. At the rear end of plate 78, shaft 85 carries an outwardly extending pin 82 upon which is pivotally mounted a block 83 that is also pivotally mounted upon an extension of pin 81 as shown particularly in Fig. 5. When the chain is moving along a straight course, as it does in portions of its travel, the distance between pins 80 and 81 is greater than when the chain is passing around sprocket 26. As the portions of the chains carrying the side plates run onto and off the sprockets the length variation is compensated for by the swinging of blocks 83. The teeth of the sprocket between the pins 80 and 81 when the gripper assembly is on the skeleton cylinder are preferably provided with a small amount of clearance so that the portion of the chain between pins 80 and 81 is loose on the sprocket. This prevents the chain from having any effect upon the proper registration of the gripper assembly in the centering blocks 73 and upon the stops 62.

In the side plates 78, 79 there are fixedly mounted two cross members or shafts 84 and 85. By this means a rigid frame is effected forming the main part of the gripper assembly. Forwardly of shaft 84 there is a further cross member or shaft 86 which is rotatably or oscillatably mounted in the side plates 78 and 79. 86 is the gripper shaft of the gripper assembly.

At intervals along the length of shaft 84 there are collars 88 which are clamped to the shaft by suitable means. Each of these collars carries an upwardly extending projection upon which is mounted a gripper pad 89. Opposite each gripper pad a gripper finger 90 is carried by shaft 86 with spring backing, as is common in the art.

In order to reduce torsional deflection in shaft 86 as much as possible the force for turning the shaft is applied at both ends thereof. Near each end of the fixed shafts 84 and 85 there is fixedly mounted a bracket 96 having a forward extension 96' disposed below or inwardly of shaft 86. On each of the brackets 96 there is a laterally extending post 97 upon which is pivoted a bell crank lever 98, one arm of which is pivoted to a short link 99 that in turn is pivoted to a crank 100 which is keyed to shaft 86. The other arm of bell crank lever 98 is pivotally connected at 98' to one end of a rod 101 that extends through a hole in a noddle pin 102 carried at the outer end of extension 96'. A spiral spring 103 surrounding rod 101 bearing against noddle pin 102 biases the parts to the Fig. 7 position, where the grippers are closed. A pair of lock nuts 104 threadably mounted on rod 101 are provided to act as stops to limit the travel of the grippers in a counterclockwise direction, and to regulate the positions of the pivot points of the toggle linkage. Preferably when the gripper fingers 90 are closed the axis of pin 99' is in alignment with the axes of post 97 and pin 100' or slightly above that position. By adjusting the nuts 104, the alignment of those pivot points may be altered.

At an intermediate point in the width of the assembly a bracket 105 is clamped to shafts 84 and 85 by screws 106, permitting adjustment of the bracket lengthwise of the shafts. The forward end of this bracket has a transverse hole therethrough surrounding shaft 86 but with a clearance large enough to admit bushing 107, the left end of which is threaded to receive a nut 108 which retains the bushing against axial movement with respect to the bracket 105. The opposite end of the bushing has a flange 109 thereon, which flange, together with the adjacent portion of the bracket 105 closely coincides with the sides of the centering block 73 at the middle of the transfer cylinder to register the gripper assembly sidewise. Preferably, the middle centering block 73 has beveled edges around its socket 74 to assist entrance of the bushing 107 into the socket. The bracket 105, being secured to the shafts 84 and 85, helps to make a rigid frame for the gripper assembly in addition to providing a third bearing for the shaft 86.

Adjacent the side plates 78 and 79 shaft 86 carries two bushings 111 having shoulders facing outwardly of the assembly which shoulders abut portions of the corresponding side plates. Collars 112 are fixed to the shaft 86 adjacent the bushings 111 to prevent axial movement of the shaft relative to the gripper assembly. The bushings 111 and the bushing 107 also are of an external diameter to fit nicely within the sockets 74 of the centering blocks 73. The width of the bushings 111 however, is somewhat greater than the width of the centering blocks 73, so that centering of the assembly in a transverse direction is effected exclusively by the middle bushing 107.

On the radially inward side of each of the side plates 78 and 79 and the middle bracket 105 as well, there is attached integrally or otherwise a locking plate 113 which is adapted to bear against stop 62 when the gripper assembly comes into registering position with the skeleton cylinder. The forward edge of each of the locking plates is adapted to be engaged by one of the hooks 64.

*Operation.*—The operation of the mechanism will be described with particular reference to Figs. 9 to 13 inclusive which show diagrammatically the successive positions of the mechanism as it approaches, is registered with, locked to, and leaves the transfer cylinder 31. As the assembly reaches the position of Fig. 9, the bushings 111 on the gripper shaft 86 enter the sockets 74 of the centering blocks 73 and the locking plates 113 move toward the stops 62. When the assembly is fully seated or nearly so, the shaft 36 is actuated by mechanism described earlier to cause pivotal movement of the collars 63 and 63' to engage the hooks 64 with the locking plates 113. If the assembly is not completely seated, engagement of beveled edges 64' of the hooks 64 with beveled edges 113' of the locking plates causes a radially inward pull on the assembly to fully seat it and hold it against any tendency toward outward movement. The assembly 28 is shown locked in registered position in Fig. 10. Figs. 11 and 12 illustrate the manner in which a sheet is transferred from the grippers 29 of the impression cylinder 21 to the grippers 90 of the transfer cylinder 31. After the sheet has been transferred to the gripper assembly 28, the actuating mechanism for the shaft 36 permits the shaft to return to its inoperative position and thereby cause withdrawal of the hooks 64 from engagement with the locking plates 113. Due to the direction of travel of the chains the gripper assembly 28 then follows the path indicated by the arrow in Fig. 13. The bushings 111 of the gripper shaft 86 leave the sockets 74 of the centering blocks 73, and the locking plates 113 gradually move away from the stops 62. The centering blocks 73, hooks 64, and stops 62 continue in their circular path so as to receive succeeding gripper assemblies as they approach the transfer cylinder.

Having thus described my invention, I claim:

1. In sheet conveyor mechanism for a printing machine, a frame, a cylinder mounted therein having sprockets at its ends, an endless conveyor comprising two chains running over said sprockets, a gripper assembly carried by said chains having front and rear extremities spaced apart a distance equal to the length of at least two links of the chains, means for connecting the forward extremity of said assembly directly to opposed pins on said chains, a self-adjusting connection between the rear extremity of the assembly and other opposed pins of said chains to compensate for varying distances between pins as the assembly travels in a circular path, said assembly comprising a plurality of parallel cross members with their axes fixed relative to each other, said cross members being spaced in the direction of chain travel, the foremost cross member of said assembly being a rotatable gripper shaft, means on said cylinder having a socket therein adapted to register said gripper shaft near its ends, and means for locking said gripper assembly to said cylinder during a portion of its travel therearound.

2. Mechanism as defined in claim 1 and including a bushing surrounding said gripper shaft in which the shaft is journaled, said bushing being dimensioned to fit into said socket.

3. Mechanism as defined in claim 2, including means associated with said bushing adapted to engage portions of said socket means for positioning the assembly transversely as it travels over said cylinder.

4. In sheet conveyor mechanism for a printing machine, a frame, a cylinder mounted therein having sprockets at its ends, an endless conveyor comprising two chains running over said sprockets, a gripper assembly having front rear extremities spaced apart a distance equal to the length of at least two links of the chains, means for connecting the forward extremity of said assembly directly to opposed pins on said chains, a self-adjusting connection between the rear extremity of the assembly and other opposed pins of said chains to compensate for varying distances between pins as the assembly travels in a circular path, said assembly comprising a pair of opposed side plates carried by said chains and a plurality of shafts mounted in said plates, the foremost shaft of said assembly being a gripper shaft and being rotatably mounted in said plates, and a second shaft being fixedly mounted in said plates, said cylinder carrying a plurality of centering blocks having sockets therein, said gripper shaft being adapted to fit into the sockets of said centering blocks for registering the gripper assembly on said cylinder with respect to the direction of rotation thereof.

5. Sheet conveying mechanism according to claim 4 wherein means is provided to lock the gripper assembly radially with respect to the cylinder during a portion of its travel around the cylinder.

6. In sheet conveyor mechanism for a printing machine, a frame, a cylinder mounted therein having sprockets at its ends, an endless conveyor comprising two chains running over said sprockets, a gripper assembly comprising a pair of opposed side plates carried by said chains and a plurality of cross members mounted in said plates, the foremost cross member of said assembly being a gripper shaft and being rotatably mounted in said plates, said cylinder carrying a plurality of centering blocks having sockets therein, said gripper shaft having a plurality of bushings thereon in which the shaft is free to rotate, said bushings each adapted to fit into the socket of one of said centering blocks for registering the gripper shaft on said cylinder with respect to the direction of rotation thereof, one of said bushings being held on its shaft against movement transversely of the assembly, and means associated with said last named bushing adapted to bear on the sides of the corresponding centering block for positioning the assembly transversely as it travels over said cylinder.

7. In sheet conveyor mechanism for a printing machine in combination, a cylinder, a conveyor passing around said cylinder, a gripper assembly carried by said conveyor, cooperating means on said assembly and said cylinder for registering the assembly with respect to the cylinder, a plurality of hooks on said cylinder spaced lengthwise thereof, each of said hooks being engageable with a portion of said assembly to lock the assembly in registered position during a portion of its travel around the cylinder, means for operating all of said hooks simultaneously, and spring means between said operating means and each of said hooks adapted to yield more or less to compensate for variations in the hooks and the portions of the assembly with which they engage.

8. In sheet conveyor mechanism for a printing machine, a frame, a cylinder mounted therein having sprockets at its ends, an endless conveyor comprising two chains running over said sprockets, a gripper assembly comprising a pair of opposed side plates carried by said chains and a plurality of transverse cross members mounted in said side plates, a locking plate carried on the inner side of each of said side plates, locking hooks oscillatably mounted on said cylinder adapted to engage said locking plates for securing the assembly to the cylinder as it travels around the cylinder, a rock shaft in said cylinder, cam means for oscillating said rock shaft through a predetermined angle during a portion of each revolution of the cylinder, and connections between said rock shaft and said hooks for swinging the hooks into locking engagement with said locking plates, said connections comprising compression springs which are adapted to yield more or less in order to compensate for inaccuracy or lack of uniformity in the locking plates of different gripper assemblies.

9. In sheet conveyor mechanism for a printing machine, a frame, a cylinder mounted therein having sprockets at its ends, an endless conveyor comprising two chains running over said sprockets, a gripper assembly comprising a pair of opposed side plates carried by said chains and three transverse shafts mounted in said side plates, the foremost shaft being oscillatable in the side plates and the second and third shafts being fixed in the side plates, a bracket intermediate the side plates secured upon said fixed shafts and rotatably receiving said foremost shaft, a locking plate carried on the radially inward side of each of said side plates and on the radially inward side of said bracket, locking hooks oscillatably mounted on said cylinder adapted to engage said locking plates for securing the assembly to the cylinder as it travels around the cylinder, a rock shaft eccentrically mounted in said cylinder, cam means for oscillating said rock shaft through a predetermined angle during a portion of each revolution of the cylinder, and connections between said rock shaft and said hooks for swinging the hooks into locking engagement with said locking plates, said connections comprising compression springs which are adapted to yield more or less in order to compensate for inaccuracies or lack of uniformity in the locking plates of different gripper shaft assemblies.

References Cited in the file of this patent

UNITED STATES PATENTS

| | | |
|---|---|---|
| 1,093,152 | Smith | Apr. 14, 1914 |
| 1,476,713 | Harrold | Dec. 11, 1923 |
| 1,566,604 | Jakeman | Dec. 22, 1925 |
| 1,746,492 | Newton | Feb. 11, 1930 |
| 2,138,405 | Huck | Nov. 29, 1938 |
| 2,138,407 | Huck | Nov. 29, 1938 |
| 2,245,343 | Hunting | June 10, 1941 |
| 2,425,680 | Kaddeland | Aug. 12, 1947 |